(12) United States Patent
Morita

(10) Patent No.: US 9,967,907 B2
(45) Date of Patent: May 8, 2018

(54) COMMUNICATION CONTROL METHOD AND PROCESSOR

(71) Applicant: KYOCERA CORPORATION, Kyoto (JP)

(72) Inventor: Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 192 days.

(21) Appl. No.: 14/780,962

(22) PCT Filed: Mar. 26, 2014

(86) PCT No.: PCT/JP2014/058654
§ 371 (c)(1),
(2) Date: Sep. 28, 2015

(87) PCT Pub. No.: WO2014/157398
PCT Pub. Date: Oct. 2, 2014

(65) Prior Publication Data
US 2016/0057794 A1 Feb. 25, 2016

Related U.S. Application Data

(60) Provisional application No. 61/806,265, filed on Mar. 28, 2013.

(51) Int. Cl.
*H04W 28/02* (2009.01)
*H04W 92/18* (2009.01)
(Continued)

(52) U.S. Cl.
CPC ..... *H04W 76/023* (2013.01); *H04W 28/0247* (2013.01); *H04W 24/02* (2013.01); *H04W 92/18* (2013.01)

(58) Field of Classification Search
CPC ............. H04W 28/0215; H04W 28/08; H04W 76/023; H04W 76/025; H04W 8/005
See application file for complete search history.

(56) References Cited

U.S. PATENT DOCUMENTS

| 2013/0250798 A1 | 9/2013 | Iwamura et al. |
| 2014/0094162 A1* | 4/2014 | Heo ................. H04W 52/0258 455/422.1 |
| 2014/0105083 A1* | 4/2014 | Krishnaswamy ..... H04W 40/22 370/311 |

FOREIGN PATENT DOCUMENTS

| JP | 08-307934 A | 11/1996 |
| JP | 2004-23613 A | 1/2004 |
| JP | 2012-119827 A | 6/2012 |

OTHER PUBLICATIONS

International Search Report issued in Application No. PCT/JP2014/058654, dated Jun. 24, 2014.
(Continued)

*Primary Examiner* — Ayaz Sheikh
*Assistant Examiner* — Debebe Asefa
(74) *Attorney, Agent, or Firm* — Studebaker & Brackett PC

(57) ABSTRACT

A communication control method is applied to a mobile communication system that includes a base station, a user terminal configured to establish a connection with the base station, and a network including the base station and a network device configured to be an upper device of the base station, and that supports D2D communication that is direct device-to-device communication. The communication control method comprises: a step of acquiring, by the network, a load level of the base station; and a step of determining, by the network, whether to permit the D2D communication of the user terminal on a basis of the load level.

9 Claims, 12 Drawing Sheets

(51) Int. Cl.
      *H04W 24/02*     (2009.01)
      *H04W 76/00*     (2018.01)
      *H04W 76/02*     (2009.01)

(56) References Cited

OTHER PUBLICATIONS

Written Opinion issued in Application No. PCT/JP2014/058654, dated Jun. 24, 2014.
3GPP TR 22.809 V12.1.0(Mar. 2013) 3rd Generation Partnership Project; Technical Specification Group Services and System Aspects; Feasibility study for Proximity Services (ProSe) (Release 12).

* cited by examiner

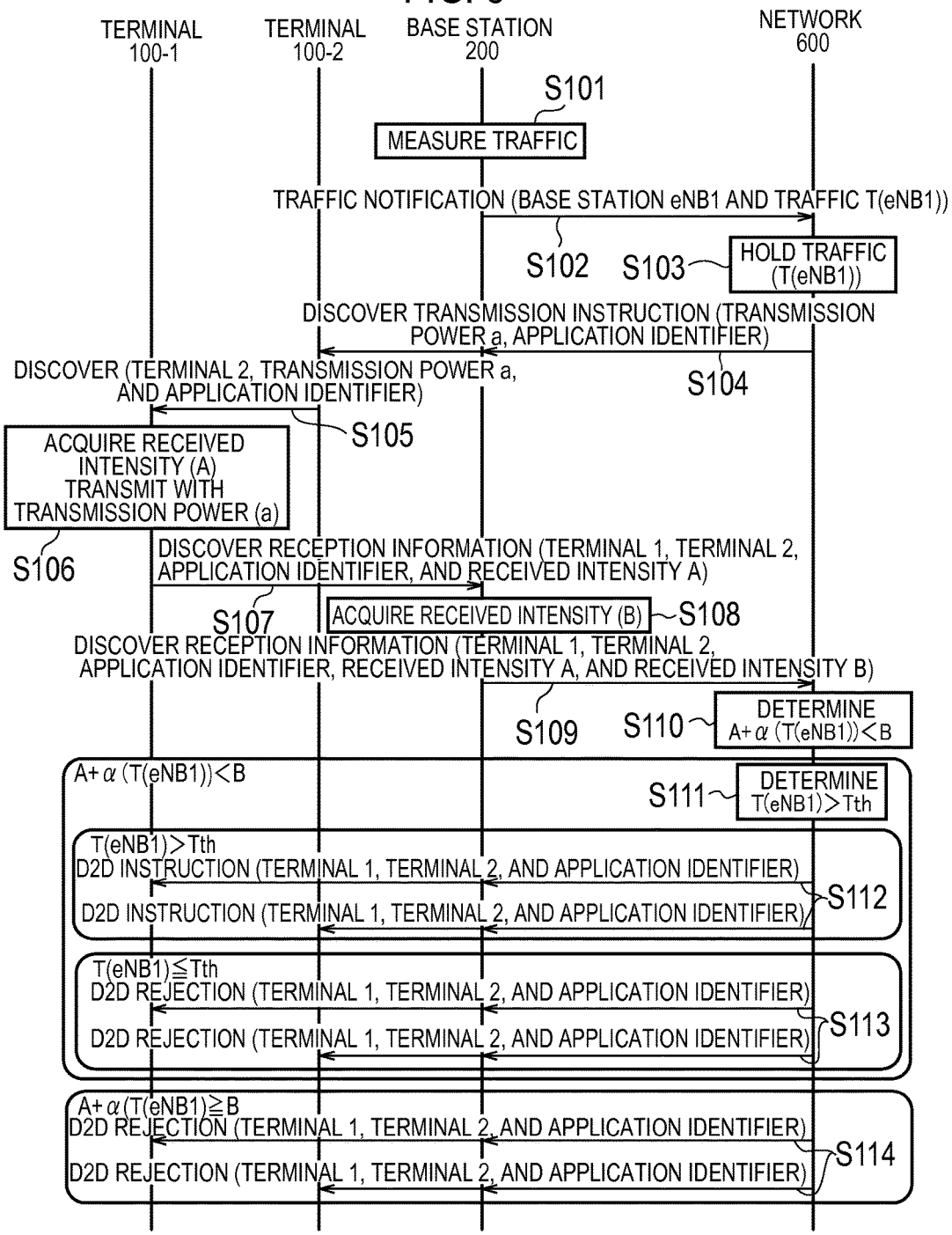

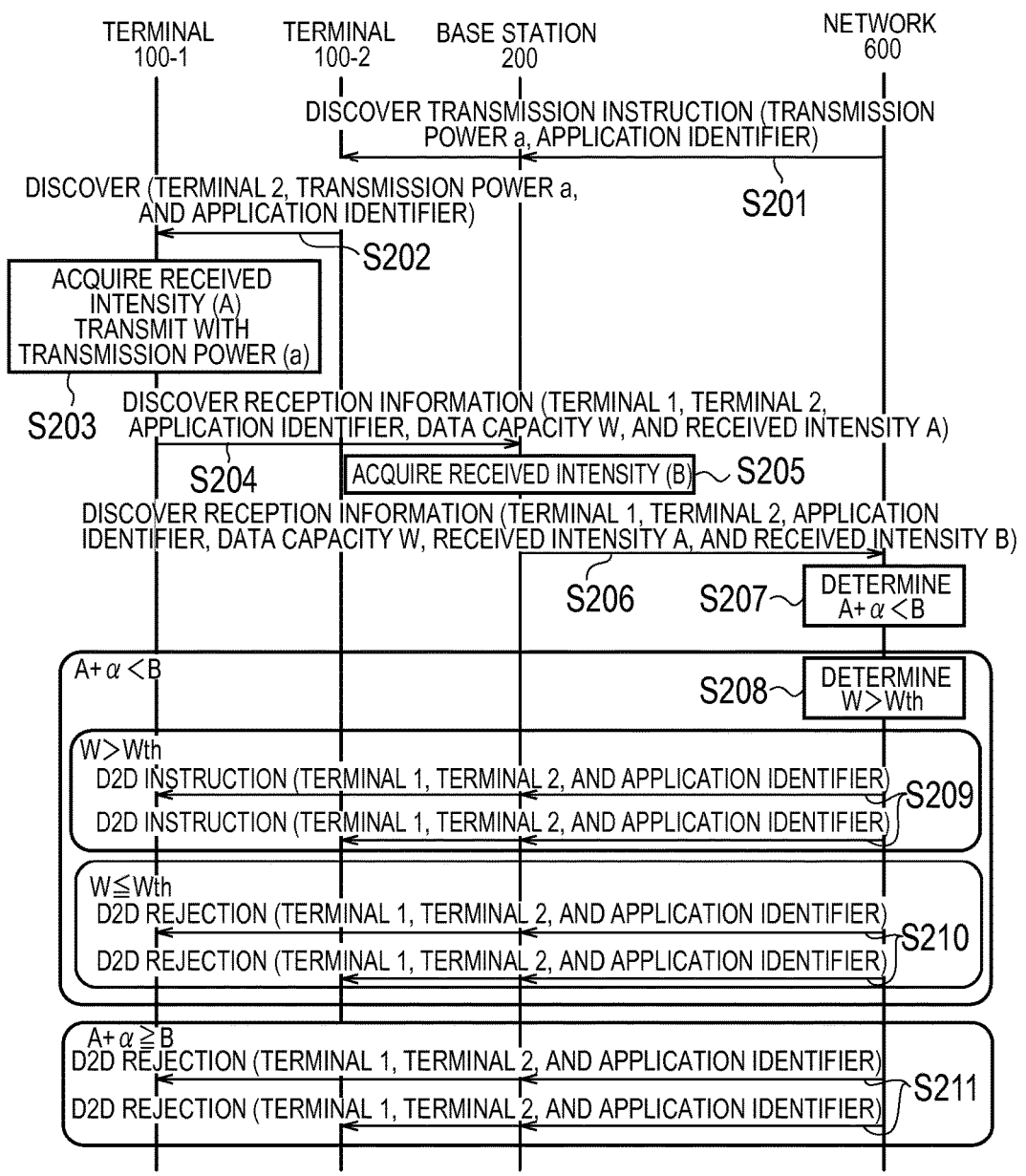

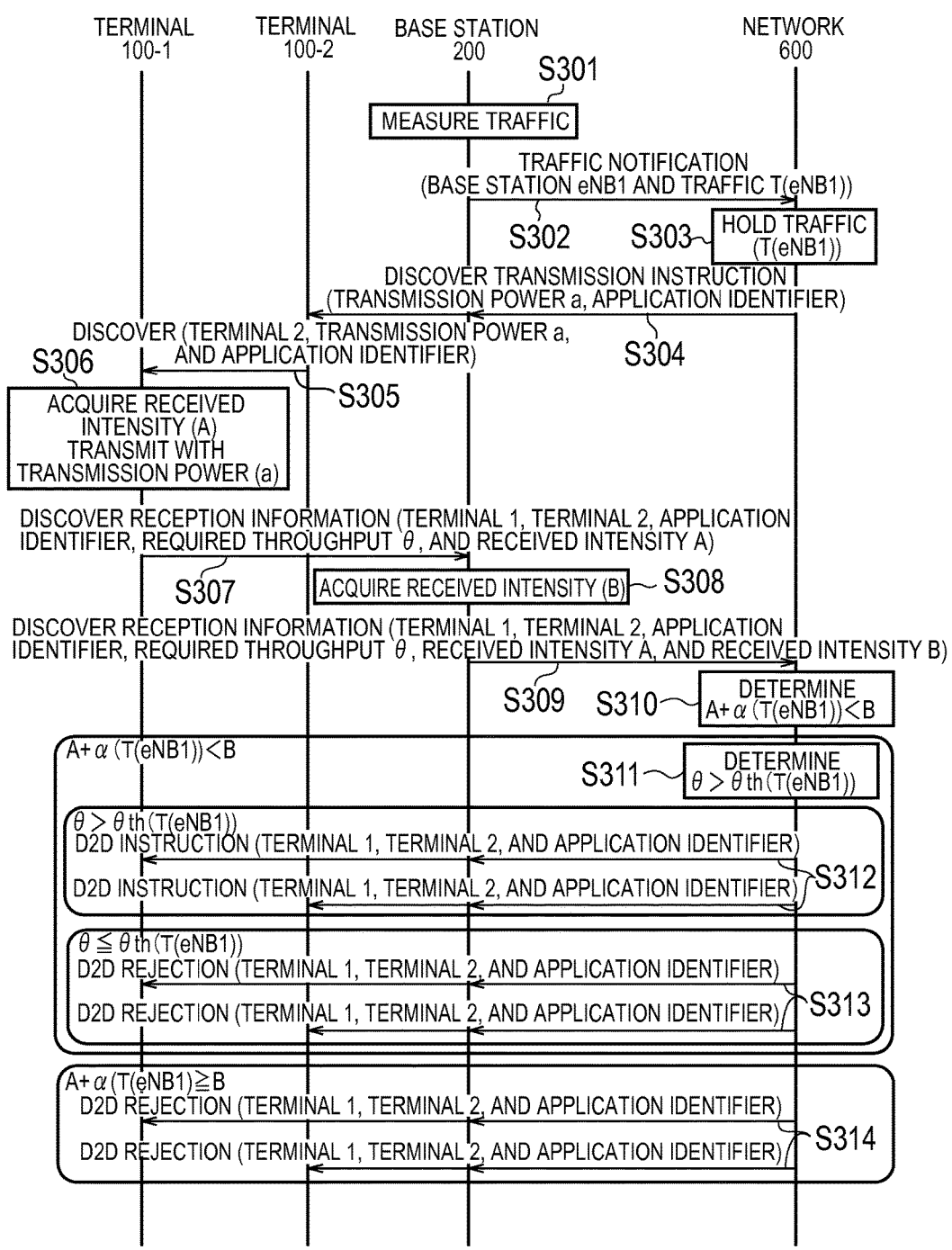

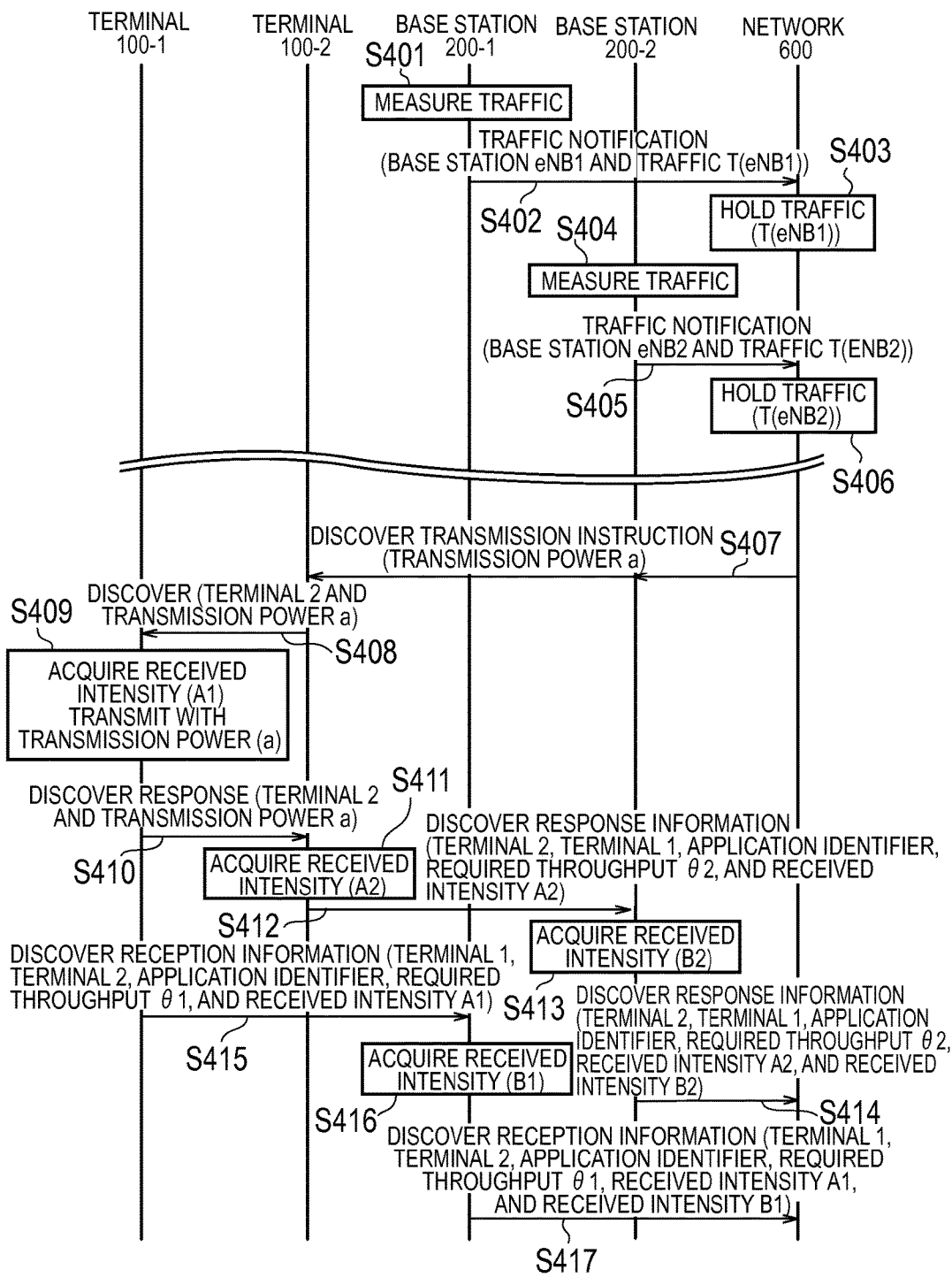

COMMUNICATION CONTROL METHOD AND PROCESSOR

TECHNICAL FIELD

The prevent invention relates to a communication control method applied to a mobile communication system that supports D2D communication, and a processor thereof.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of proximity user terminals perform direct communication without passing through a core network. That is, a data path of the D2D communication does not pass through the core network. On the other hand, a data path of normal communication (cellular communication) of a mobile communication system passes through the core network.

PRIOR ART DOCUMENT

Non-Patent Document

[Non Patent Literature 1] 3GPP technical report "TR 22.803 V12.1.0" Mar. 15, 2013

SUMMARY OF THE INVENTION

Since a user terminal performing D2D communication performs direct communication without passing through a core network, it is possible to reduce a load on a network.

However, in order to reduce the load on the network, in the case of increasing the number of user terminals performing the D2D communication, an interference area, where the user terminals performing the D2D communication give interference to neighboring user terminals and base stations, increases.

Therefore, the present invention provides a communication control method and a processor with which it is possible to reduce a load on a network while controlling the number of user terminals performing D2D communication.

According to an embodiment, a communication control method is applied to a mobile communication system that includes a base station, a user terminal configured to establish a connection with the base station, and a network including the base station and a network device configured to be an upper device of the base station, and that supports D2D communication that is direct device-to-device communication. The communication control method comprises a step of acquiring, by the network, a load level of the base station, and a step of determining, by the network, whether to permit the D2D communication of the user terminal on a basis of the load level.

BRIEF DESCRIPTION OF THE DRAWINGS

FIG. 8 is a sequence diagram showing an operation example of the mobile communication system according to a first embodiment.
FIG. 9 is a sequence diagram showing an operation example of the mobile communication system according to a second embodiment.
FIG. 10 is a sequence diagram showing an operation example of the mobile communication system according to a third embodiment.
FIG. 12 is a sequence diagram showing an operation example of the mobile communication system according to a modification of the third embodiment.

DESCRIPTION OF THE EMBODIMENT

Overview of Embodiment

Figure 1:
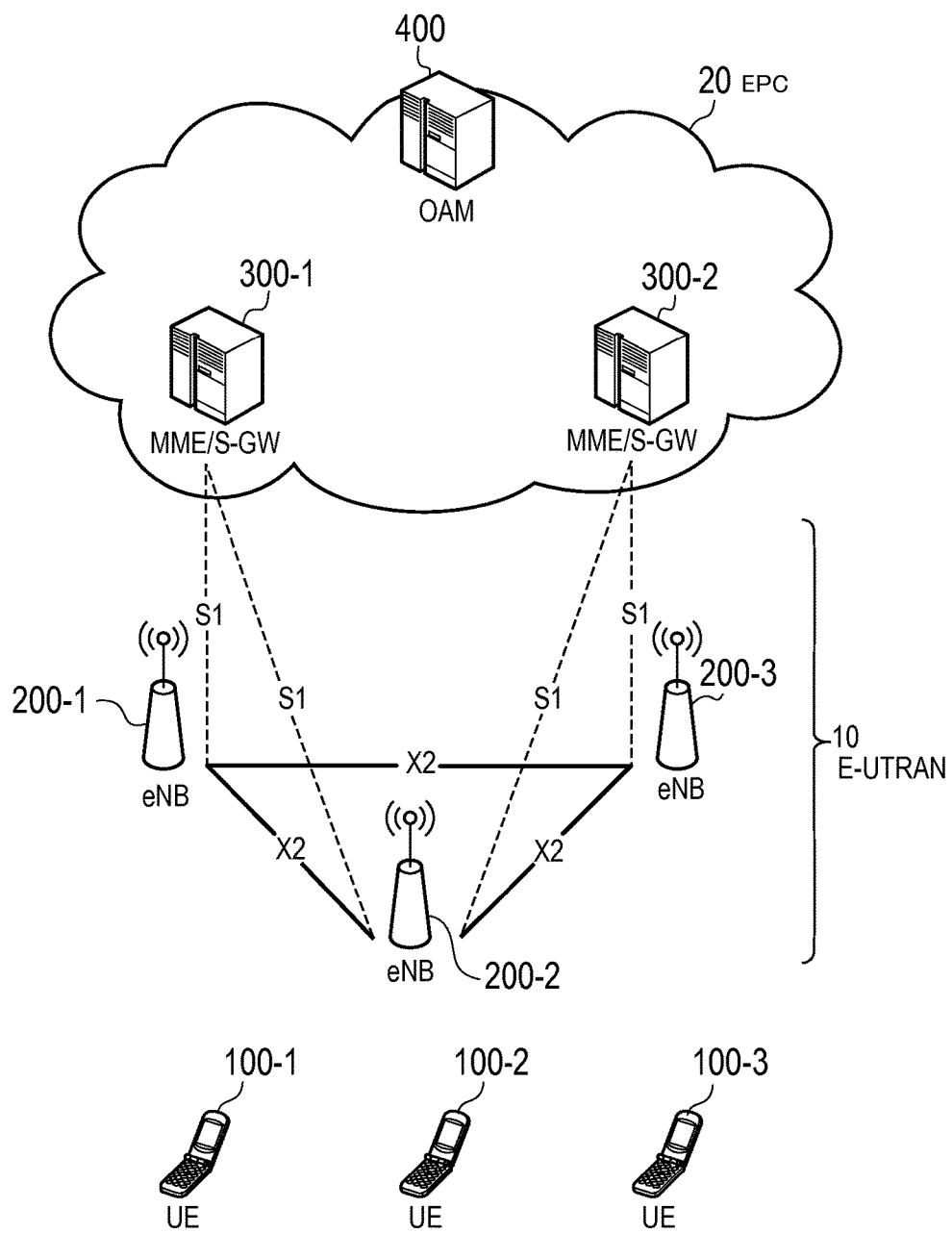
FIG. 1 is a configuration diagram of an LTE system.

A communication control method according to an embodiment is a communication control method applied to a mobile communication system that includes a base station, a user terminal configured to establish a connection with the base station, and a network including the base station and a network device configured to be an upper device of the base station, and that supports D2D communication that is direct device-to-device communication, and comprises a step of acquiring, by the network, a load level of the base station, and a step of determining, by the network, whether to permit the D2D communication of the user terminal on a basis of the load level. As a result, a network can control the number of user terminals that perform. D2D communication depending on the load level. Consequently, it is possible to reduce a load on the network while controlling the number of the user terminals that perform the D2D communication.

In a first embodiment, the step of acquiring the load level comprises a step of acquiring, by the network, an actual measured load level actually measured by the base station as the load level, wherein in the step of determining, the network permits the D2D communication when the load level exceeds a threshold value. As a result, when a load on a network is smaller than a predetermined threshold value, since D2D communication is not permitted, it is possible to suppress an increase in the number of user terminals that perform the D2D communication. Meanwhile, when the load on the network is larger than the predetermined threshold value, the D2D communication is permitted, so that it is possible to reduce the load on the network.

A communication control method according to a second embodiment further comprises a step of transmitting, by the user terminal, to the network, data information corresponding to the amount of data to be transmitted in the D2D communication, wherein the step of acquiring the load level comprises a step of acquiring, by the network, an expected load level expected by the data information as the load level, and in the step of determining, the network permits the D2D communication when the load level exceeds a threshold value. As a result, when an expected load level is large, data is allowed to be preferentially transmitted by D2D communication, so that it is possible to reduce a load on a network. Meanwhile, when the expected load level is small, since the load on the network is not large even though data is transmitted by cellular communication, the D2D communication is not permitted, so that it is possible to suppress an increase in the number of user terminals that perform the D2D communication.

In the second embodiment, in the step of transmitting the data information, the user terminal transmits, to the network, a plurality of pieces of data information corresponding to the amount of data to be transmitted in each of a plurality of applications used in the D2D communication, in the step of acquiring the load level, the network acquires each of a plurality of expected load levels expected by each of the plurality of pieces of data information as the load level, and in the step of determining, the network permits the D2D communication when one or more load levels of the plurality of load levels exceed the threshold value. As a result, D2D communication of a user terminal is easy to be permitted, so that it is possible to further reduce a load on a network.

The communication control method according to the second embodiment further comprises a step of calculating, by the network, a sum value of the plurality of load levels when each of the plurality of load levels does not exceed the threshold value in the step of determining, wherein in the step of determining, the network permits the D2D communication when the sum value exceeds the threshold value. As a result, D2D communication of a user terminal is easy to be permitted, so that it is possible to further reduce a load on a network.

A communication control method according to a third embodiment further comprises a step of deciding, by the network, the threshold value depending on to an actual measured load level actually measured by the base station. As a result, it is possible to determine whether to permit D2D communication depending on a load on a network, so that it is possible to further reduce the load on the network while controlling the number of user terminals that perform the D2D communication.

The communication control method according to the third embodiment further comprises a step of deciding, by the network, the threshold value depending on the number of user terminals that are connected to the base station and scheduled to perform the D2D communication with the user terminal. As a result, it is possible to determine whether to permit D2D communication depending on a load on a network, so that it is possible to further reduce the load on the network while controlling the number of user terminals that perform the D2D communication.

The communication control method according to the third embodiment further comprised a step of deciding, by the network, the threshold value depending on a load level of a neighboring base station when another user terminal, which is scheduled to perform the D2D communication with the user terminal, is connected to the neighboring base station adjacent to the base station. As a result, depending on a load level of a neighboring base station, it is possible to determine whether to permit D2D communication of a user terminal connected to abase station, so that it is possible to further reduce a load on a network while controlling the number of user terminals that perform the D2D communication.

A communication control method according to a fourth embodiment further comprises a step of acquiring, by the network, the load level of the base station while the user terminal which is permitted to perform the D2D communication is performing the D2D communication in the step of determining, and a step of determining, by the network, whether to end the D2D communication of the user terminal on the basis of the acquired load level during performing the D2D communication. As a result, even when the D2D communication is performed, it is possible to end the D2D communication, so that it is possible to further control the number of user terminals that perform the D2D communication.

The communication control method according to the fourth embodiment further comprises a step of transmitting, by the network, an instruction for ending the D2D communication to the user terminal when it is determined to end the D2D communication in the step of determining whether to end the D2D communication, wherein in the step of transmitting the instruction, the network does not transmit the instruction for ending the D2D communication while the user terminal is continuing the D2D communication. As a result, a D2D end instruction is transmitted after D2D communication is ended once. Consequently, it is less probable for a user terminal having ended the D2D communication in the middle of data transmission to transmit data by cellular communication, so that it is possible to reduce a load on a network.

The communication control method according to the fourth embodiment further comprises a step of deciding a threshold value used for comparison in the step of determining whether to end the D2D communication with the acquired load level during performing the D2D communication, wherein in the step of deciding the threshold value, when the user terminal performing the D2D communication performs handover to a neighboring base station adjacent to the base station, the network decides the threshold value to be a small value as compared with the case where the user terminal performs no handover. As a result, even when a user terminal performs handover, it is easy to continuously perform D2D communication, so that the D2D communication of the user terminal is difficult to be interrupted.

The communication control method according to the first embodiment further comprises a step of periodically or aperiodically transmitting, by the base station, the actual measured load level to the network, wherein in the step of transmitting the actual measured load level, when the difference between a first actual measured load level and a second actual measured load level exceeds a threshold value, the base station transmits the second actual measured load level to the network, the first actual measured load level being the actual measured load level, the second actual measured load level being the actual measured load level actually measured by the base station after the first actual measured load level. As a result, an actual measured load level (the second actual measured load level) is transmitted to a network only when the difference between the actual measured load levels is large, so that it is possible to reduce a load on a network.

In other embodiments, the step of acquiring the load level comprises a step of acquiring, by the network, an actual measured load level actually measured by the base station as the load level, wherein in the step of determining, the network permits the D2D communication with a probability corresponding to the actual measured load level. As a result, even when a load on a network is small, it is probable that D2D communication is permitted, so that it is possible to effectively utilize the D2D communication while controlling the number of user terminals that perform the D2D communication.

A processor according to an embodiment is a processor provided in a network device in a mobile communication system that includes a base station, a user terminal configured to establish a connection with the base station, and a network including the base station and a network device configured to be an upper device of the base station, and that supports D2D communication that is direct device-to-device communication, and executes: a process for acquiring a load level of the base station; and a process for determining whether to permit the D2D communication of the user terminal on the basis of the load level.

A processor according to an embodiment is a processor provided in a user terminal in a mobile communication system that includes a base station, the user terminal configured to establish a connection with the base station, and a network including the base station and a network device configured to be an upper device of the base station and supports D2D communication that is direct device-to-device communication, and executes: a process for transmitting, to the network, data information corresponding to the amount of data scheduled to be transmitted in the D2D communication, wherein the data information is used in order to acquire a load level of the base station used in order to determine whether to permit the D2D communication of the user terminal.

Hereinafter, with reference to the accompanying drawings, the description will be provided for each embodiment when D2D communication is introduced to a cellular mobile communication system (hereinafter, an "LTE system") configured according to the 3GPP standards.

First Embodiment

Hereinafter, the first embodiment will be described.
(LTE System)
FIG. 1 is a configuration diagram of an LTE system according to a present embodiment.

As shown in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GW (Serving-Gateway) 300 and OAM (Operation and Maintenance) 400. Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, configurations of the UE 100 and the eNB 200 will be described.

Figure 2:
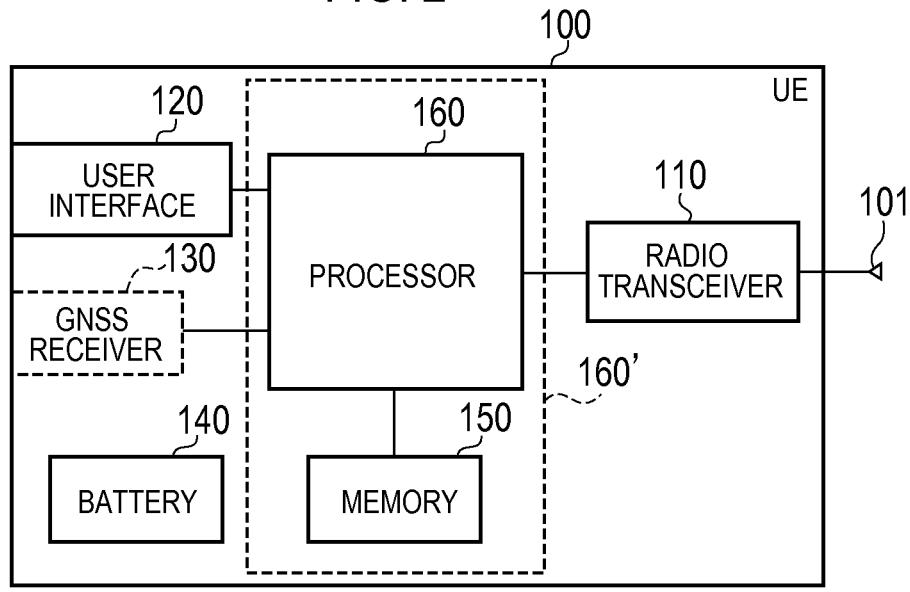
FIG. 2 is a block diagram of UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 and the processor 160 configure a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
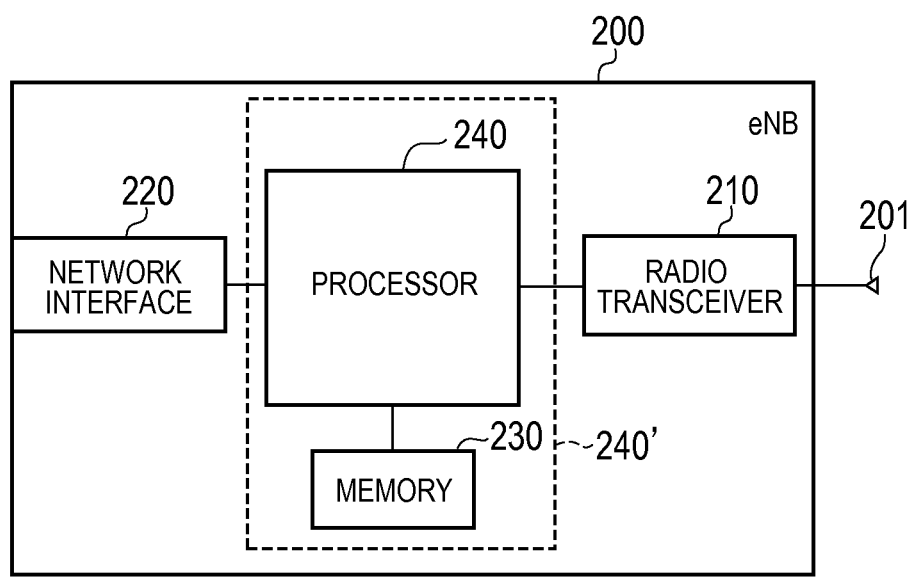
FIG. 3 is a block diagram of eNB.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
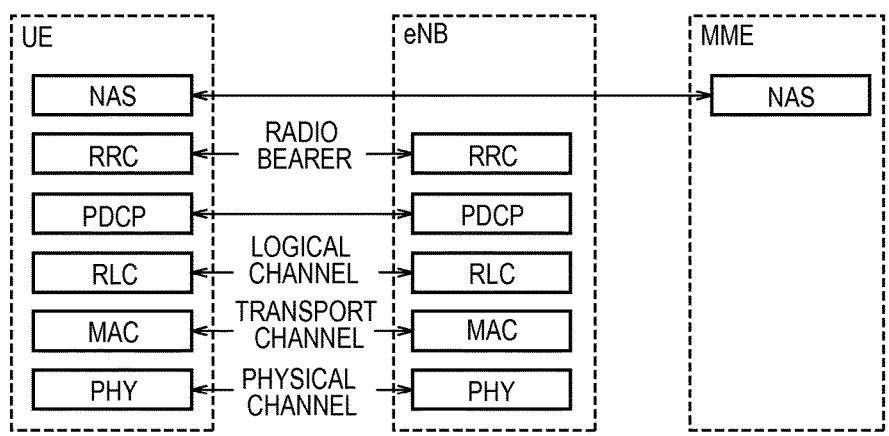
FIG. 4 is a protocol stack diagram of a radio interface in the LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes MAC (Media Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

NAS (Non-Access Stratum) layer positioned above the RRC layer performs session management, mobility management and the like.

Figure 5:
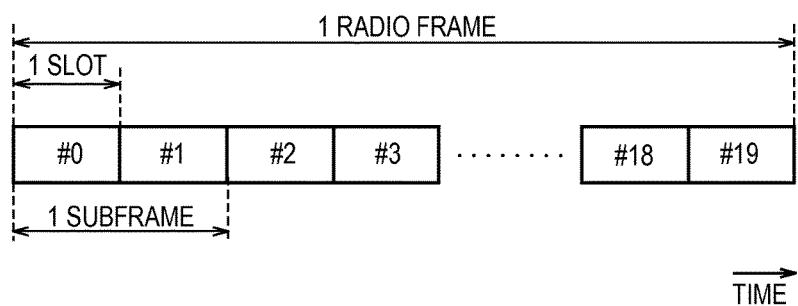
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (the cellular communication) in the LTE system.

Figure 6:
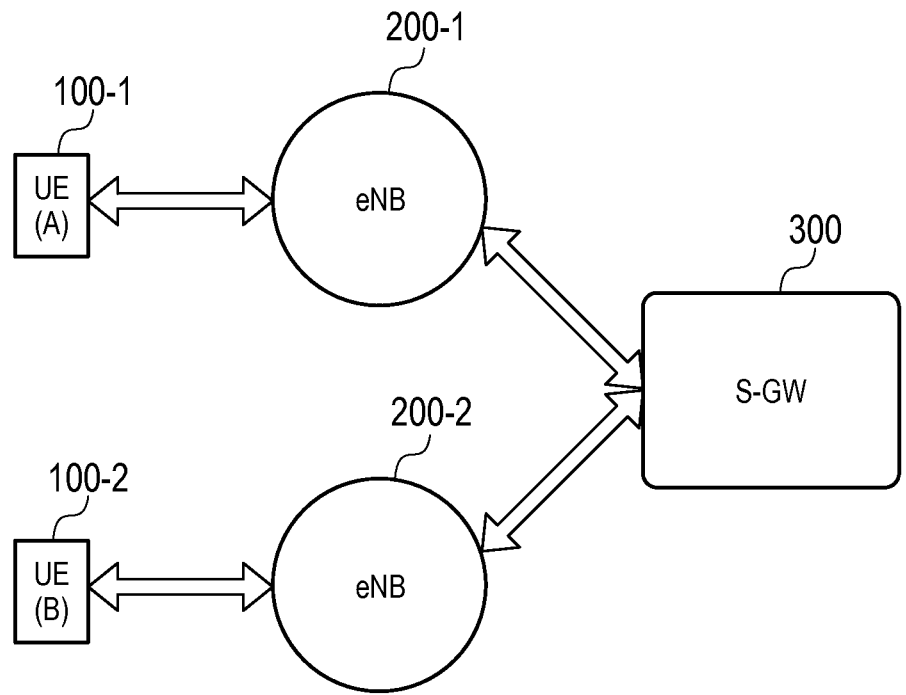
FIG. 6 is a diagram showing a data path in cellular communication.

FIG. 6 is a diagram showing a data path in the cellular communication. In this case, FIG. 6 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As shown in FIG. 6, the data path of the cellular communication passes through the network. Specifically, the data path is set to pass through the eNB 200-1, the S-GW 300, and the eNB 200-2.

Figure 7:
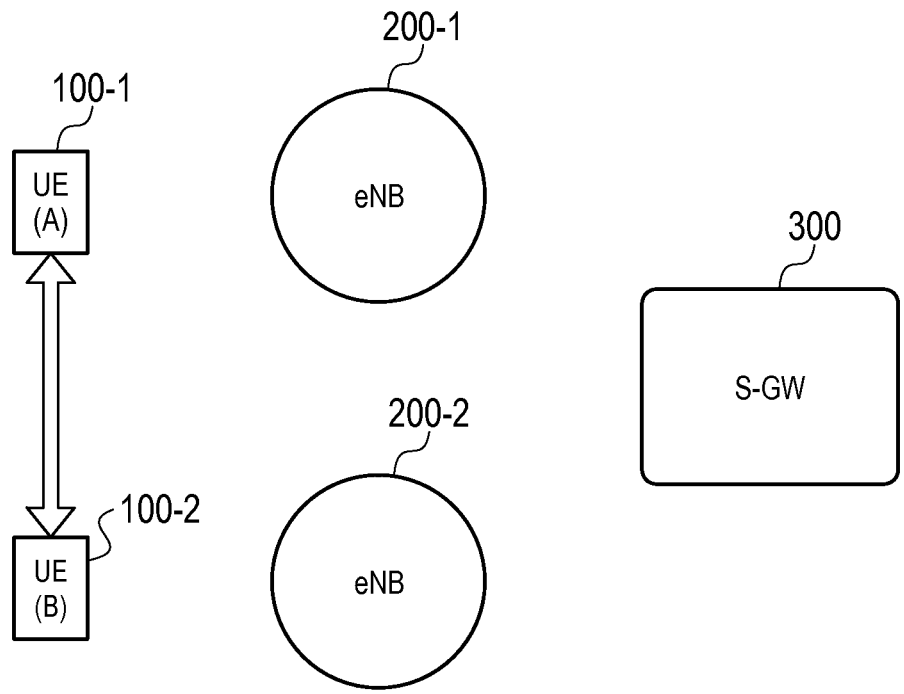
FIG. 7 is a diagram showing a data path in D2D communication.

FIG. 7 is a diagram showing a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the proximity of the one UE 100, so that the D2D communication starts. It is noted that in order to start the D2D communication, the UE 100 has a (Discover) function of discovering the other UE 100 existing in the proximity of the UE 100. Furthermore, the UE 100 has a (Discoverable) function discovered by the other UE 100.

As shown in FIG. 7, the data path of the D2D communication does not pass through the network. That is, direct radio communication is performed between the UEs. As described above, when the UE 100-2 exists in the proximity of the UE 100-1, the D2D communication is performed between the UE 100-1 and the UE 100-2, thereby obtaining an effect that a traffic load on the network and a battery consumption amount of the UE 100 are reduced, for example. In addition, in a mode called Locally Routed (locally routed mode), a data path passes through the eNB 200 without passing through the S-GW 300.

It is noted that cases in which the D2D communication is started include (a) a case in which the D2D communication is started after a proximity terminal is discovered by performing an operation for discovering a proximity terminal, and (b) a case in which the D2D communication is started without performing an operation for discovering a proximity terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximity terminal, the UE 100 has a (Discover) function of discovering another UE 100 existing in the proximity of the UE 100, and/or a (Discoverable) function of being discovered by another UE 100.

Specifically, the UE 100-1 transmits a discovery signal (Discovery signal) that is used to either discover a proximity terminal or to be discovered by a proximity terminal. The UE 100-2 that receives the discovery signal discovers the UE 100-1. When the UE 100-2 transmits a response to the discovery signal, the UE 100-1 that has transmitted the discovery signal discovers the UE 100-2, which is the proximity terminal.

It is noted that the UE 100 need not necessarily perform the D2D communication even upon discovering a proximity terminal, for example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. It is noted that when the UE 100-1 does not perform the D2D communication after discovering a proximity terminal, the UE 100-1 may report, to an upper layer (for example, an application), the discovery of the proximity UE 100 (that is, the UE 100-2). For example, the application is capable of executing a process based on the report (for example, a process of plotting the position of the UE 100-2 in the geographical information).

Moreover, the UE 100 is capable of reporting the discovery of a proximity terminal to the eNB 200, and is also capable of receiving, from the eNB 200, an instruction regarding whether to communicate with the proximity terminal through the cellular communication or through the D2D communication.

On the other hand, in the above-described case (b), for example, the UE 100-1 starts the transmission (such as a notification through broadcasting) of a signal for the D2D communication without specifying a D2D communication partner. Thus, the UE 100 is capable of starting the D2D communication regardless of the existence of the discovery of a proximity terminal. It is noted that the UE 100-2 that is performing the standby operation for the signal for the D2D communication performs synchronization or/and demodulation on the basis of the signal from the UE 100-1.

Operation of Mobile Communication System
According to First Embodiment

Next, by using FIG. 8, an operation of a mobile communication system according to a first embodiment will be described.

FIG. 8 is a sequence diagram showing an operation example of the mobile communication system according to the first embodiment. In the present embodiment, a network 600 is the MME/S-GW 300. Furthermore, in the present embodiment, the UE 100-1 and the UE 100-2 establish a connection with the eNB 200.

As shown in FIG. 8, in step S101, the eNB 200 measures a load level of the eNB 200. In the present embodiment, the eNB 200 measures an entire traffic amount T(eNB1) of the eNB 200. The eNB 200 periodically or aperiodically measures the traffic amount T(eNB1).

In step S102, the eNB 200 transmits a traffic notification to the network 600. The network 600 receives the traffic notification.

When a change in the traffic amount T(eNB1) is large, the eNB 200 may notify the network 600 of the traffic amount T(eNB1). Specifically, the eNB 200 stores a traffic amount T1 measured previous time and sent to the network 600 previous time. Next, In the case of measuring a traffic amount T2, when the difference between the traffic amount T1 and the traffic amount T2 measured this time exceeds a threshold value, the eNB 200 notifies the network 600 of the traffic amount T2. The eNB 200 stores the traffic amount T2 sent to the network 600.

The traffic notification includes information indicating an identifier (eNB1) of the eNB 200 and the traffic amount T(eNB1) of the eNB 200.

In step S103, the network 600 holds the traffic amount T(eNB1) included in the traffic notification. That is, the network 600 acquires the traffic amount T(eNB1).

In step S104, the network 600 transmits a Discover transmission instruction to the UE 100-2 via the eNB 200. The UE 100-2 receives the Discovery transmission instruction.

For example, when the traffic amount T(eNB1) exceeds a predetermined threshold value and when the UE 100-1 and the UE 100-2 each established a connection with the eNB 200 perform cellular communication, the network 600 may perform the Discover transmission instruction. Furthermore, when the traffic amount T(eNB1) exceeds a predetermined threshold value and when there is a cellular communication request in the UE 100-1 established a connection with the eNB 200 from the UE 100-2 established a connection with the eNB 200, the network 600 may also perform the Discover transmission instruction.

The Discover transmission instruction is an instruction for transmitting, to UE 100, a discovery signal (a Discovery signal) for discovering (or discovered by a partner terminal) the partner terminal in D2D communication. The Discover transmission instruction includes information (transmission power a) indicating a transmission power value of the Discovery signal of the UE 100-2, and information (an application identifier) indicating an application identifier used in the D2D communication.

In step S105, the UE 100-2 transmits the Discovery signal. That is, the UE 100-2 performs Discover.

The Discovery signal includes information (a terminal 2) indicating an identifier for identifying the UE 100-2, information (transmission power a) indicating a transmission power value of the Discovery signal of the UE 100-2, and information (an application identifier) indicating an application identifier used in the D2D communication.

In steps S106 and S107, the UE 100-1 receives the Discovery signal and transmits Discover reception information to the eNB 200.

The UE 100-1 measures received power of the Discovery signal. As a result, the UE 100-1 acquires a received intensity A of the Discovery signal. Furthermore, the UE 100-1 transmits the Discover reception information with the transmission power a included in the Discovery signal.

The Discover reception information is information indicating that the Discovery signal was received, and is information indicating that D2D communication is requested. The Discover reception information includes information (a terminal 1) indicating an identifier for identifying the UE 100-1, the terminal 2, the application identifier, and the acquired received intensity A.

In step S108, the eNB 200 receives the Discover reception information. The eNB 200 measures received power of the Discover reception information. As a result, the eNB 200 acquires a received intensity B of the Discover reception information.

In step S109, the eNB 200 transmits the Discover reception information to the network 600. The Discover reception information in step S109 includes information indicating the received intensity B of the Discover reception information, in addition to the information included in the Discover reception information in step S107.

In step S110, the network 600 determines whether to permit the D2D communication on the basis of the Discover reception information. Specifically, the network 600 permits D2D communication by the UE 100-1 and the UE 100-2 when the following condition is satisfied.

$$A+\alpha(T(\text{eNB1}))<B$$

In the present embodiment, $\alpha(T(\text{eNB1}))$ is a predetermined value decided by the network 600 depending on the traffic amount T(eNB1). Details thereof will be described later (refer to FIG. 11(A) of a third embodiment).

Meanwhile, the network 600 rejects the D2D communication by the UE 100-1 and the UE 100-2 when the above condition is not satisfied.

In step S110, when the network 600 permits the D2D communication, a process of step S111 is executed. Meanwhile, in step S110, when the network 600 rejects the D2D communication, a process of step S114 is executed.

In step S111, the network 600 determines whether to permit the D2D communication on the basis of the held traffic amount T(eNB1).

Specifically, when the traffic amount T(eNB1) is large, the network 600 determines to permit the D2D communication, and when the traffic amount T(eNB1) is small, the network 600 determines not to permit the D2D communication. That is, when the traffic amount T(eNB1) exceeds a threshold value Tth (T(eNB1)>Tth), a process of step S112 is executed. Meanwhile, when traffic amount T(eNB1) does not exceed the threshold value Tth (T(eNB1)≤Tth), a process of step S113 is executed.

In step S112, the network 600 performs a D2D instruction indicating the permission of the D2D communication with respect to each of the UE 100-1 and the UE 100-2 via the eNB 200.

The D2D instruction includes the identifier (the terminal 1) of the UE 100-1, the identifier (the terminal 2) of the UE 100-2, and the application identifier.

Each of the UE 100-1 and the UE 100-2 receives the D2D instruction. The UE 100-1 and the UE 100-2 having received the D2D instruction start the D2D communication.

Meanwhile, in step S113, the network 600 performs a D2D rejection instruction indicating the rejection of the D2D communication with respect to each of the UE 100-1 and the UE 100-2 via the eNB 200.

The D2D rejection instruction includes the identifier (the terminal 1) of the UE 100-1, the identifier (the terminal 2) of the UE 100-2, and the application identifier.

Each of the UE 100-1 and the UE 100-2 receives the D2D rejection instruction. As a result, the UE 100-1 and the UE 100-2 are not able to perform the D2D communication.

Furthermore, in step S114, similarly to step S113, the network 600 performs the D2D rejection instruction indicating the rejection of the D2D communication with respect to each of the UE 100-1 and the UE 100-2 via the eNB 200.

Conclusion of First Embodiment

In the present embodiment, the communication control method comprises a step of acquiring, by the network 600, the traffic amount T(eNB1) and a step of determining, by the network 600, whether to permit the D2D communication of the UE 100-1 on the basis of the traffic amount T(eNB1). As a result, the network 600 determines whether to permit the D2D communication of the UE 100-1 on the basis of the traffic amount T(eNB1), so that it is possible to control the number of UEs 100 that perform the D2D communication depending on the traffic amount T(eNB1). Consequently, it is possible to reduce a load on a network while controlling the number of the UEs 100 that perform the D2D communication.

In the present embodiment, when the traffic amount T(eNB1) exceeds the threshold value Tth, the network 600 permits the D2D communication. As a result, when the traffic amount T(eNB1) is smaller than the threshold value Tth, the network 600 does not permit the D2D communication, so that it is possible to suppress an increase in the number of UEs 100 that perform the D2D communication. Meanwhile, when the traffic amount T(eNB1) is larger than the threshold value Tth, the network 600 permits the D2D communication, so that it is possible to reduce a load on the eNB 200.

In the present embodiment, the communication control method further comprises a step of periodically or aperiodically transmitting, by the eNB 200, the traffic amount to the network 600, wherein when the difference between the traffic amount T1 and the traffic amount T2 actually measured by the eNB1 after the traffic amount T1 exceeds a threshold value, the eNB 200 transmits the traffic amount T2 to the network 600. As a result, the eNB 200 notifies the network 600 of the traffic amount only when a change in the traffic amount is large, so that it is possible to reduce loads on the eNB 200 and the network 600.

Second Embodiment

Operation of Mobile Communication System According to Second Embodiment

Next, by using FIG. 9, an operation of the mobile communication system according to a second embodiment will be described. FIG. 9 is a sequence diagram showing an operation example of the mobile communication system according to the second embodiment. It is noted that description will be provided while focusing on a portion different from the above-described embodiment, and description of a similar portion will be omitted, where necessary.

In the aforementioned first embodiment, the load level of the eNB 200 is the traffic amount T(eNB1) (the actual measured load level) actually measured by the eNB 200. In the present embodiment, the load level of the eNB 200 is a data capacity W (an expected load level) that is transmitted by the UE 100-1 in D2D communication.

Steps S201 and S202 shown in FIG. 9 correspond to steps S104 and S105 of the first embodiment.

In steps S203 and S204, similarly to steps S106 and S107 of the first embodiment, the UE 100-1 receives a Discovery signal and transmits Discover reception information to the eNB 200. In the present embodiment, the Discover reception information includes data information corresponding to a data amount of data scheduled to be transmitted by the UE 100-1 in the D2D communication, in addition to information indicating the terminal 1, the terminal 2, the application identifier, and the received intensity A. Specifically, the data information includes information indicating the data capacity W.

Steps S205 and S206 correspond to steps S108 and S109 of the first embodiment.

In step S206, the network 600 receives the Discover reception information, thereby acquiring a load level (the data capacity W), which is expected by the data information, as the load level of the eNB 200.

In step S207, the network 600 determines whether to permit the D2D communication on the basis of the Discover reception information. Specifically, the network 600 permits D2D communication by the UE 100-1 and the UE 100-2 when the following condition is satisfied.

$$A+\alpha < B$$

In the present embodiment, a denotes an integer. In addition, similarly to the first embodiment, a may be decided depending on the traffic amount T(eNB1), or may not be decided depending on the traffic amount T(eNB1).

In step S207, when the D2D communication is permitted, a process of step S208 is executed. Meanwhile, in step S207, when the D2D communication is rejected, a process of step S211 is executed.

In step S208, when the data capacity W exceeds a threshold value Wth (W>Wth), the network 600 executes a process of step S209. Meanwhile, in step S208, when the data capacity W does not exceed the threshold value Wth (W≤Wth), a process of step S210 is executed.

Steps S209 to S211 correspond to steps S112 to S114 of the first embodiment.

Modification of Second Embodiment

Next, a modification of the second embodiment will be described. It is noted that description will be provided while focusing on a portion different from the above-described embodiment, and description of a similar portion will be omitted, where necessary.

In the aforementioned second embodiment, the network 600 determines whether to permit D2D communication on the basis of the data capacity W that is an expected load level. In the aforementioned second embodiment, whether to permit D2D communication may be determined on the basis of the following expected load level.

(1) Transmission Time t

When the UE 100-1 transmits data of the data capacity W by using a currently assigned band R, the network 600 may determine whether to permit D2D communication on the basis of a transmission time t (=W/R) required for the transmission.

In this case, the UE 100-1 transmits, as data information, information indicating the data capacity W and the band R currently assigned to the UE 100-1. Furthermore, the UE 100-1 may transmit the transmission time t as the data information.

(2) Required Throughput θ

The network 600 may determine whether to permit D2D communication on the basis of required throughput θ required by the UE 100-1.

When the UE 100-1 does not know an entire data capacity W scheduled to be transmitted in the D2D communication (for example, in the case of making a call), the UE 100-1 may transmit the required throughput θ to the network 600. That is, when transmission of a constant capacity of data is continuously performed, the UE 100-1 may also transmit the required throughput θ to the network 600.

The required throughput θ may be calculated on the basis of a data capacity W transmitted and received for a certain period when cellular communication is performed between the UE 100-1 and the UE 100-2. Furthermore, the required throughput θ may be throughput assumed (for example, assumed from a voice coding rate or an image coding rate) from an application used in the D2D communication.

(3) A Plurality of Expected Load Levels

The network 600 may determine whether to permit D2D communication on the basis of a plurality of expected load levels.

For example, when the UE 100-1 is scheduled to use a plurality of applications in the D2D communication, the UE 100-1 transmits, to the network 600, a plurality of pieces of data information corresponding to a data amount scheduled to be transmitted in each of the plurality of applications. Specifically, when the UE 100-1 performs temporary data transmission (for example, file transfer) and continuous data transmission as described above, the UE 100-1 transmits, to the network 600, the data capacity W in the temporary data transmission and the required throughput θ in the continuous data transmission, as the data information.

When the data capacity W exceeds a threshold value Wth and when the required throughput θ exceeds a threshold value θth, the network 600 may permit the D2D communication, and when the data capacity W exceeds the threshold value Wth or the required throughput θ exceeds the threshold value θth, the network 600 may also permit the D2D communication. Moreover, even though the data capacity W does not exceed the threshold value Wth and the required throughput θ does not exceed the threshold value θth, when a sum value of the data capacity W and the required throughput θ exceeds the threshold value, the network 600 may also permit the D2D communication.

In this case, the sum value of the data capacity W and the required throughput θ may be calculated as follows.

For example, a data capacity $W_\theta$ is calculated by multiplying the required throughput θ by the transmission time t of the data capacity W. When a sum value of the data capacity W and the data capacity $W_\theta$ exceeds the threshold value Wth, the network 600 may also permit the D2D communication. Furthermore, throughput θw per a unit time is calculated by dividing the data capacity W by the transmission time t. When a sum value of the throughput θw and the required throughput θ exceeds the threshold value θth, the network 600 may also permit the D2D communication.

Conclusion of Second Embodiment

In the present embodiment, the communication control method further comprises a step of transmitting, by the UE 100-1, to the network 600, data information corresponding to the amount of data scheduled to be transmitted in the D2D communication, wherein the step of acquiring, the network 600, the load level of the eNB 200 comprises a step of acquiring, the network 600, the data capacity W as the load level of the eNB 200, and the network 600 permits the D2D communication when the data capacity W exceeds the threshold value Wth. As a result, when the data capacity W of data transmitted by the UE 100-1 is large, data is allowed to be preferentially transmitted by the D2D communication, so that it is possible to reduce a load on a network. Meanwhile, when the data capacity W of the data transmitted by the UE 100-1 is small, since the load on the network is not large even though the data transmitted by the UE 100-1 is transmitted by cellular communication, the D2D communication is not permitted, so that it is possible to suppress an increase in the number of user terminals that perform the D2D communication.

In the present modification, when the data capacity W and the required throughput θ are transmitted to the network 600 and at least one of the data capacity W and the required throughput θ exceeds the threshold value, the network 600 permits the D2D communication. As a result, the D2D communication of the UE 100 is easy to be permitted, so that it is possible to further reduce a load on the network 600.

In the present modification, when the sum value of the data capacity W and the data capacity $W_\theta$ exceeds the threshold value Wth, the network 600 may also permit the D2D communication, when the sum value of the throughput θw and the required throughput θ exceeds the threshold value θth, the network 600 may also permit the D2D communication. As a result, the D2D communication of the UE 100 is easy to be permitted, so that it is possible to further reduce a load on the network 600.

Third Embodiment

Operation of Mobile Communication System According to Third Embodiment

Figure 11A:
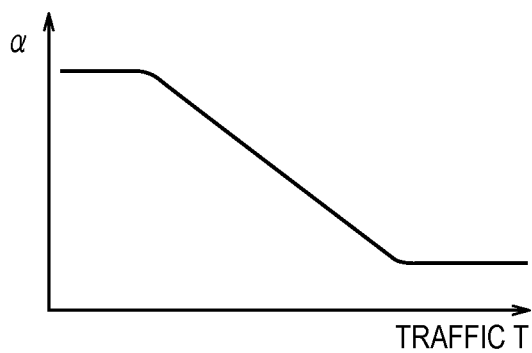
FIG. 11(A) is a diagram showing a relation between a predetermined value α and a traffic amount T.
Figure 11B:
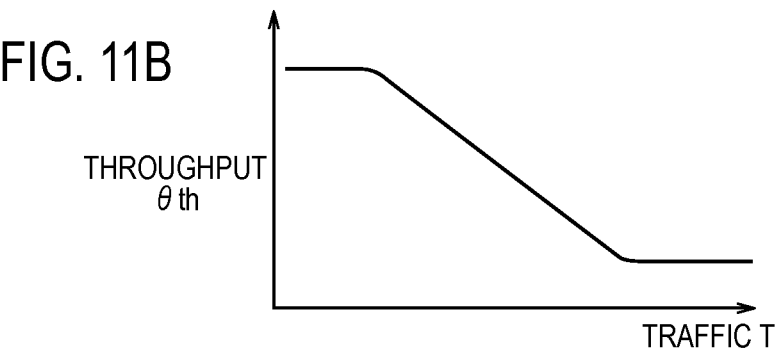
FIG. 11(B) is a diagram showing a relation between a threshold value θth and the traffic amount T.

Next, by using FIG. 10 and FIG. 11, an operation of the mobile communication system according to a third embodiment will be described. FIG. 10 is a sequence diagram showing an operation example of the mobile communication system according to the third embodiment. FIG. 11(A) is a diagram showing a relation between a predetermined value α and a traffic amount T. FIG. 11(B) is a diagram showing a relation between a threshold value θth and the traffic amount T. It is noted that description will be provided while focusing on a portion different from the above-described embodiment, and description of a similar portion will be omitted, where necessary.

In the aforementioned second embodiment, the threshold value Wth is not decided depending on the traffic amount T. However, in the present embodiment, the threshold value θth is decided depending on the traffic amount T. Furthermore, in the present embodiment, instead of the data capacity W, the required throughput θ is transmitted.

Steps S301 to S303 shown in FIG. 10 correspond to steps S101 to S103 of the first embodiment. Steps S304 to S310 correspond to steps S201 to S207 of the second embodiment by replacing the data capacity W with the required throughput θ.

In each of steps S310 and S311, the network 600 decides each of a predetermined value α(T(eNB1)) and a threshold value θth(T(eNB1)) of throughput depending on the traffic amount T(eNB1).

Specifically, in the present embodiment, as shown in FIG. 11(A), the predetermined value α(T(eNB1)) is decided such that the predetermined value α(T(eNB1)) becomes large when the traffic amount T(eNB1) is small, and becomes small when the traffic amount T(eNB1) is large. Furthermore, the predetermined value α(T(eNB1)) is constant when the traffic amount T(eNB1) is smaller than a predetermined value and when the traffic amount T(eNB1) is larger than the predetermined value.

Furthermore, as shown in FIG. 11(B), the threshold value θth(T(eNB1)) is equal to the predetermined value α(T(eNB1)). That is, the threshold value θth(T(eNB1)) is decided depending on the traffic amount T(eNB1).

In step S310, when D2D communication is permitted, a process of step S311 is executed. Meanwhile, in step S310, when D2D communication is rejected, a process of step S314 is executed.

In step S311, when the required throughput θ exceeds the threshold value θth (θ>θth), the network 600 executes a process of step S312. Meanwhile, when the required throughput θ does not exceed the threshold value θth (θ≤θth), a process of step S313 is executed.

For example, in the case where the traffic amount T(eNB1) is small, the D2D communication is permitted only when the required throughput θ required by the UE 100 is high (for example, video distribution, or continuous data transfer based on voice and a high quality image such as high resolution television phone). Meanwhile, in the case where the traffic amount T(eNB1) is large, the D2D communication is permitted even when the required throughput θ required by the UE 100 is low (for example, low resolution video distribution, or continuous data transfer based on voice and a low quality image such as low resolution television phone).

Steps S312 to S314 correspond to steps S112 to S114 of the first embodiment.

Figure 13:
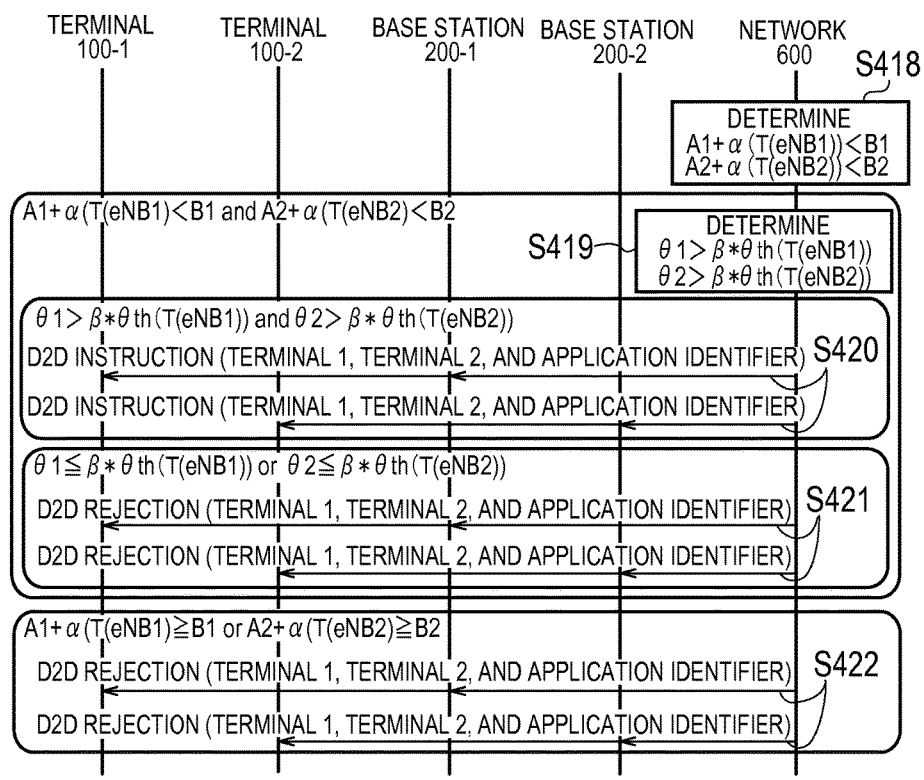
FIG. 13 is a sequence diagram showing an operation example of the mobile communication system according to the modification of the third embodiment.

Operation of Mobile Communication System According to Modification of Third Embodiment Next, an operation of the mobile communication system according to the modification of the third embodiment will be described with reference to FIG. 12 and FIG. 13. FIG. 12 and FIG. 13 are sequence diagrams showing an operation example of the mobile communication system according to the modification of the third embodiment. It is noted that description will be provided while focusing on a portion different from the above-described embodiment, and description of a similar portion will be omitted, where necessary.

In the aforementioned first embodiment, the UE 100-1 and the UE 100-2 establish a connection with the eNB 200. In the present modification, the UE 100-1 establishes a connection with the eNB 200-1 and the UE 100-2 establishes a connection with the eNB 200-2 adjacent to the eNB 200-1.

As shown in FIG. 12, in step S401, the eNB 200-1 measures an entire traffic amount of the eNB 200-1.

In step S402, the eNB 200-1 transmits a traffic notification to the network 600. The network 600 receives the traffic notification. The traffic notification includes information indicating an identifier (eNB1) of the eNB 200-1 and a traffic amount T(eNB1) of the eNB 200-1.

In step S403, the network 600 holds the traffic amount T(eNB1) included in the traffic notification.

In step S404, the eNB 200-2 measures an entire traffic amount of the eNB 200-2.

In step S405, the eNB 200-2 transmits a traffic notification to the network 600. The network 600 receives the traffic notification. The traffic notification includes information indicating an identifier (eNB2) of the eNB 200-2 and a traffic amount T(eNB2) of the eNB 200-2.

In step S406, the network 600 holds the traffic amount T(eNB2) included in the traffic notification.

Steps S407 and S408 correspond to steps S104 and S105 of the first embodiment.

In steps S409 and S410, the UE 100-1 receives a Discovery signal and transmits a Discover response signal to the UE 100-2. The UE 100-2 receives the Discover response signal.

The UE 100-1 measures received power of the Discovery signal. As a result, the UE 100-1 acquires received intensity A1 of the Discovery signal. Furthermore, the UE 100-1 transmits the Discover response signal with the transmission power a included in the Discovery signal.

The Discover response signal is information indicating that the Discovery signal was received, and is transmitted to the UE 100-2. Furthermore, the Discover response signal includes information indicating the terminal 2 and the transmission power a. The Discover response signal may include information indicating the identifier (the terminal 1) of the UE 100-1.

In step S411, the UE 100-2 measures received power of the Discover response signal. As a result, the UE 100-2 acquires received intensity A2 of the Discover response signal.

In step S412, the UE 100-2 transmits Discover response signal with the transmission power a. The eNB 200-2 receives the Discover response information.

The Discover response information is information indicating that the Discover response signal was received, and is information indicating that D2D communication is requested. The Discover response information includes information indicating the terminal 1, the terminal 2, the application identifier, required throughput $\theta 2$, and the acquired received intensity A2.

In step S413, the eNB 200-2 measures received power of the Discover response information. As a result, the eNB 200-2 acquires received intensity B2 of the Discover response information.

In step S414, the eNB 200-2 transmits the Discover response information to the network 600. The Discover response information in step S414 includes information indicating the received intensity B2 of the Discover response information, in addition to the information included in the Discover response information in step S412.

Steps S415 to S417 correspond to steps S307 to S309 of the third embodiment. In addition, throughput required by the UE 100-1 is a required throughput $\theta 1$, and the received intensity of Discover reception information received by the eNB 200-1 is the received intensity B1.

As shown in FIG. 13, in step S418, the network 600 determines whether to permit D2D communication on the basis of the Discover reception information and the Discover response information. Specifically, the network 600 permits D2D communication by the UE 100-1 and the UE 100-2 when the following condition is satisfied.

$A1+\alpha(T(\text{eNB1}))<B1$ $A2+\alpha(T(\text{eNB2}))<B2$

Meanwhile, the network 600 rejects the D2D communication by the UE 100-1 and the UE 100-2 when the above condition is not satisfied.

In step S418, when the D2D communication is permitted, a process of step S419 is executed. Meanwhile, in step S418, when the D2D communication is rejected, a process of step S422 is executed.

In step S419, the network 600 determines whether the required throughput $\theta 1$ and the required throughput $\theta 2$ exceed a predetermined threshold value.

Specifically, when the required throughput $\theta 1$ exceeds a threshold value $\beta \times \theta\text{th}(T(\text{eNB1}))$ and when the required throughput $\theta 2$ exceeds a threshold value $\beta \times \theta\text{th}(T(\text{eNB2}))$, the network 600 determines to permit the D2D communication, so that a process of step S420 is executed. Meanwhile, when the required throughput $\theta 1$ does not exceed the threshold value $\beta \times \theta\text{th}(T(\text{eNB1}))$ or when the required throughput $\theta 2$ does not exceed the threshold value $\beta \times \theta\text{th}(T(\text{eNB2}))$, the network 600 determines not to permit the D2D communication, so that a process of step S421 is executed.

In this case, in $\theta\text{th}(T(\text{eNB1}))$ and $\theta\text{th}(T(\text{eNB2}))$, the $\theta\text{th}(T(\text{eNB1}))$ is decided depending on the traffic amount T(eNB1) of the eNB 200-1 and the $\theta\text{th}(T(\text{eNB2}))$ is decided depending on the traffic amount T(eNB2) of the eNB 200-2, similarly to the aforementioned third embodiment.

Furthermore, in the present modification, the network 600 decides a value of the coefficient $\beta$ depending on a predetermined condition, thereby deciding a value of a threshold value to be compared with the required throughput.

Specifically, the network 600 decides the coefficient $\beta$ depending on the number (N+1) of UEs 100 that are connected to the eNB 200-1 and scheduled to perform D2D communication with the UE 100-1. For example, the network 600 decides the coefficient $\beta$ to be 1/(N+1). In addition, the network 600 may decide the coefficient $\beta$ depending on the number N of UEs 100 that are connected to the eNB 200-2 and scheduled to perform D2D communication with the UE 100-2. In the present embodiment, since N=0, the coefficient $\beta$ is 1.

Furthermore, as with the present modification, when the eNB 200-1, to which the UE 100-1 connects, differs from the eNB 200-2 to which the UE 100-2 scheduled to perform D2D communication with the UE 100-1 connects (that is, when eNBs 200, to which a plurality of UEs 100 performing the D2D communication connect, differ from each other), the network 600 may decide the coefficient $\beta$ depending on a load level of the eNB 200-1 or the eNB 200-2. Accordingly, the network 600 may decide a threshold value, which is compared in order to permit the D2D communication of the UE 100-1 connected to the eNB 200-1, depending on a load level of the eNB 200 adjacent to the eNB 200-1.

For example, the network 600 may decide the coefficient $\beta$ depending on a larger one of the traffic amount T(eNB1) and the traffic amount T(eNB2).

In addition, the load level of the eNB 200-1 or the eNB 200-2 may be the number of UEs 100 scheduled to perform the D2D communication.

The network 600 decides the coefficient $\beta$, so that the threshold value $\beta \times \theta\text{th}(T(\text{eNB1}))$ and the threshold value $\beta \times \theta\text{th}(T(\text{eNB2}))$ are decided.

The network performs determination on the basis of the decided threshold values.

Steps S420 to S422 correspond to steps S112 to S114 of the first embodiment.

Conclusion of Third Embodiment

In the present embodiment, the communication control method further comprises a step of deciding, by the network 600, the threshold value to be compared with the throughput θ depending on the traffic amounts (T(eNB1) and T(eNB2)). As a result, it is possible to determine whether to permit the D2D communication depending on a load on the network 600, so that it is possible to further reduce the load on the network 600 while controlling the number of UEs 100 that perform the D2D communication.

In the modification of the present embodiment, in the communication control method, the network 600 decides the threshold value depending on the number of UEs 100 connected to the eNB 200-1 and scheduled to perform the D2D communication with the UE 100-1. As a result, it is possible to determine whether to permit the D2D communication depending on a load on the eNB 200, so that it is possible to further reduce the load on the network 600 while controlling the number of UEs 100 that perform the D2D communication.

In the modification of the present embodiment, in the communication control method, when the UE 100-2 connects to the eNB 200-2 adjacent to the eNB 200-1, the network 600 decides the threshold value depending on a load level of the eNB 200-2. As a result, it is possible to determine whether to permit the D2D communication of the UE 100-1 connected to the eNB 200-1 depending on the load level of the eNB 200-2, so that it is possible to further reduce the load on the network 600 while controlling the number of UEs 100 that perform the D2D communication.

Fourth Embodiment

Operation of Mobile Communication System According to Fourth Embodiment

Figure 14:
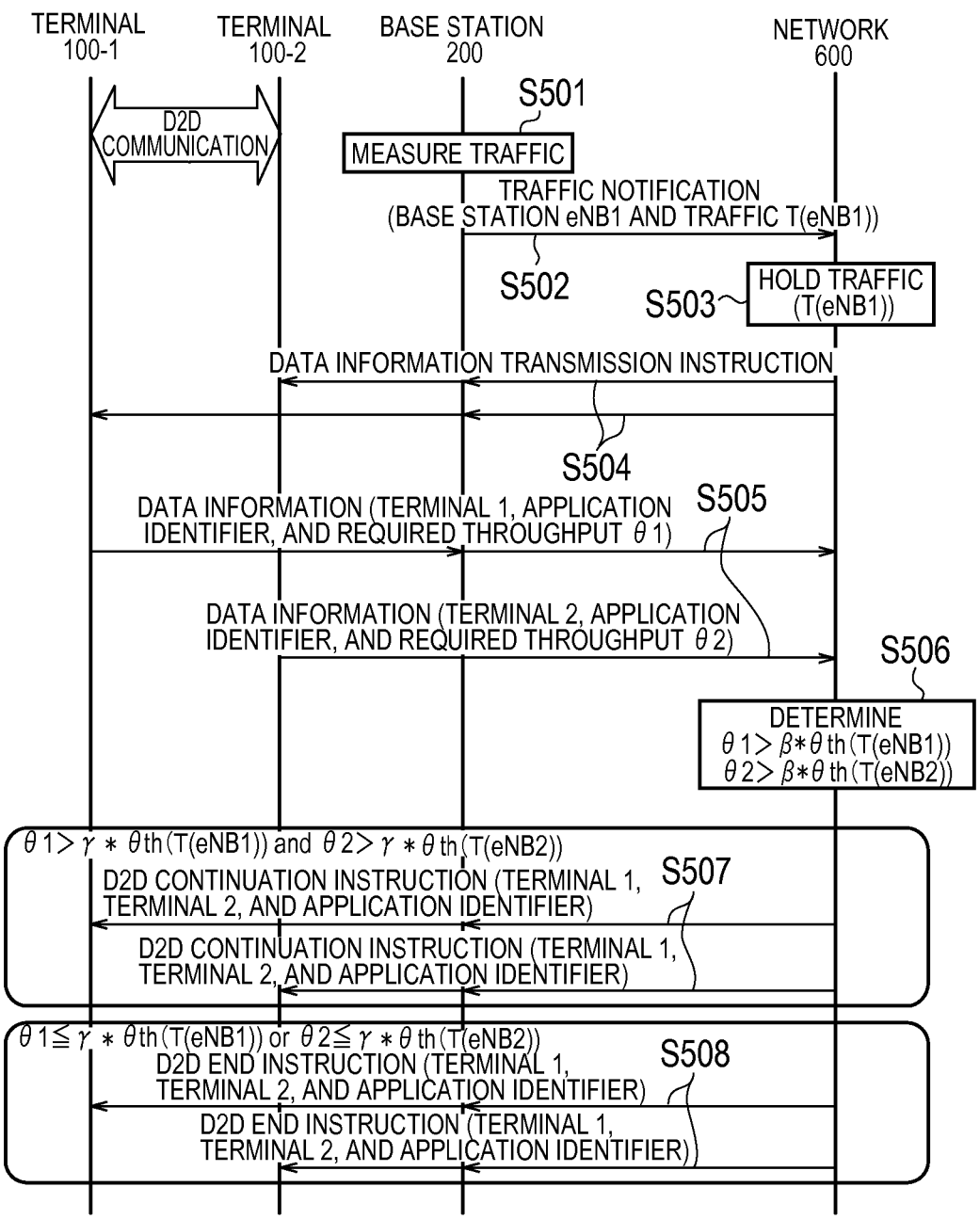
FIG. 14 is a sequence diagram showing an operation example of the mobile communication system according to a fourth embodiment.

Next, an operation of the mobile communication system according to a fourth embodiment will be described with reference to FIG. 14. FIG. 14 is a sequence diagram showing an operation example of the mobile communication system according to the fourth embodiment. It is noted that description will be provided while focusing on a portion different from the above-described embodiment, and description of a similar portion will be omitted, where necessary.

In the aforementioned first to third embodiments, no D2D communication is performed between the UE 100-1 and the UE 100-2. However, in the present embodiment, as shown in FIG. 14, the D2D communication is performed between the UE 100-1 and the UE 100-2.

Steps S501 to S503 correspond to steps S101 to S103 of the first embodiment.

In step S504, the network 600 performs a data information transmission instruction with respect to the UE 100-1 and the UE 100-2 via the eNB 200. Each of the UE 100-1 and the UE 100-2 receives the data information transmission instruction.

The data information transmission instruction is an instruction for instructing each of the UE 100-1 and the UE 100-2 to transmit data information corresponding to a data amount of data scheduled to be transmitted in D2D communication to the network 600.

In step S505, each of the UE 100-1 and the UE 100-2 transmits the data information to the network 600 via the eNB 200. The network 600 receives the data information from each of the UE 100-1 and the UE 100-2.

In the present embodiment, the data information is information indicating the required throughput θ in the D2D communication. The UE 100-1 transmits the data information including the terminal 1, the application identifier, and the required throughput θ1. The UE 100-2 transmits the data information including the terminal 2, the application identifier, and the required throughput θ2.

In step S506, similarly to step S419 of the modification of the third embodiment, the network 600 determines whether the required throughput θ1 and the required throughput θ2 exceed a predetermined threshold value. The network 600 determines whether to end the D2D communication.

In step S506, when the required throughput θ1 exceeds the threshold value β×θth(T(eNB1)) and when the required throughput θ2 exceeds the threshold value β×θth(T(eNB2)), the network 600 determines not to end the D2D communication, so that a process of step S507 is executed. Meanwhile, when the required throughput θ1 does not exceed the threshold value β×θth(T(eNB1)) or when the required throughput θ2 does not exceed the threshold value β×θth(T(eNB2)), the network 600 determines to end the D2D communication, so that a process of step S508 is executed.

In step S507, the network 600 performs a D2D continuation instruction indicating that the D2D communication is continued with respect to each of the UE 100-1 and the UE 100-2. The UE 100-1 and the UE 100-2 having received the D2D continuation instruction continue the D2D communication.

Meanwhile, in step S508, the network 600 performs a D2D end instruction indicating that the D2D communication is ended with respect to each of the UE 100-1 and the UE 100-2.

While the UE 100-1 and the UE 100-2 are continuing the D2D communication, the network 600 may not transmit an instruction for ending the D2D communication. Specifically, when it is determined to stop the D2D communication (the throughput θ in the D2D communication is 0), the network 600 may perform the D2D end instruction on the basis of the data information transmitted from the UE 100-1 and the UE 100-2.

The UE 100-1 and the UE 100-2 having received the D2D end instruction end the D2D communication. In addition, the network 600 may control the D2D communication to be switched to cellular communication.

Figure 15:
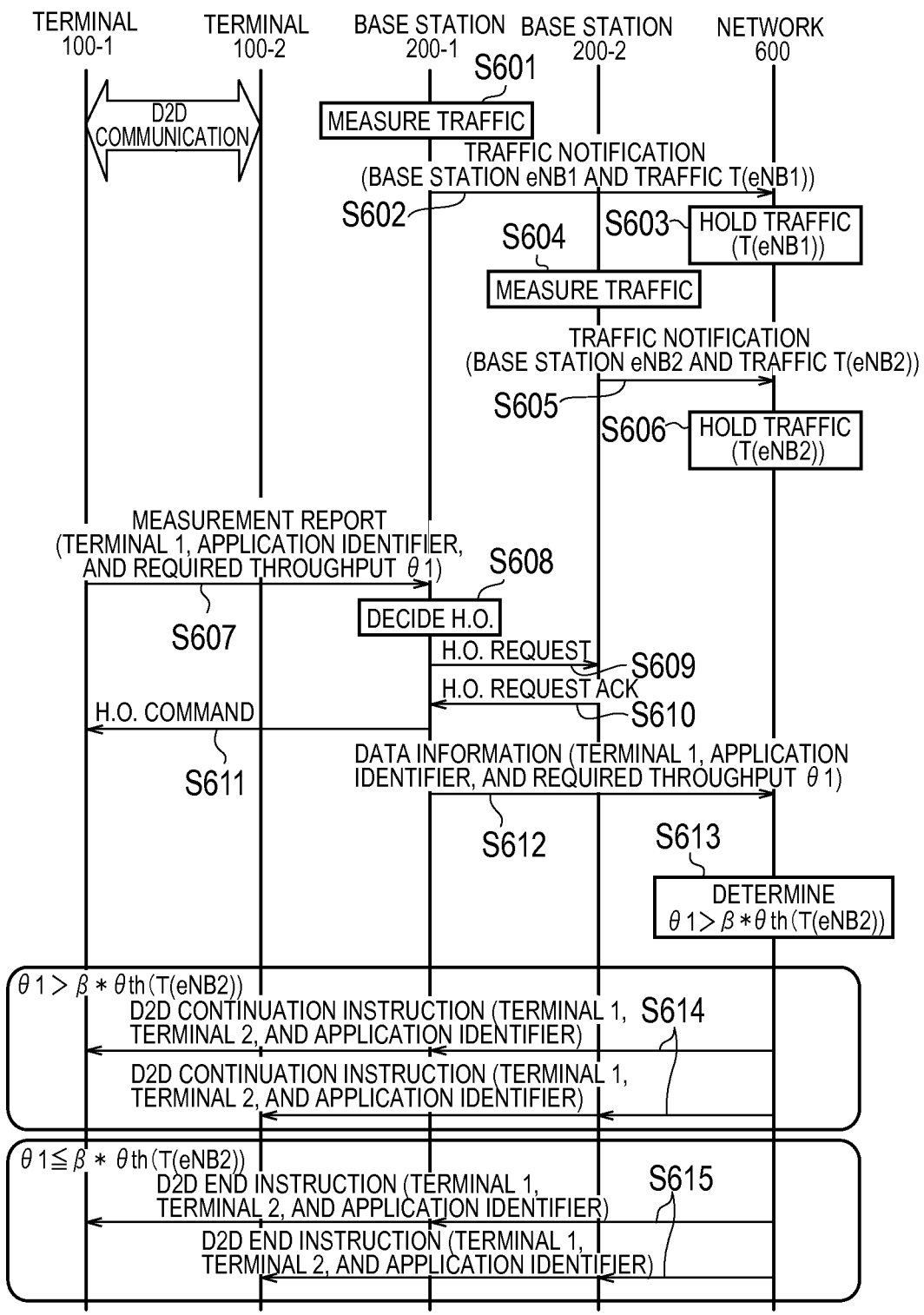
FIG. 15 is a sequence diagram showing an operation example of the mobile communication system according to the modification of the fourth embodiment.

Operation of Mobile Communication System According to Modification of Fourth Embodiment Next, an operation of the mobile communication system according to the modification of the fourth embodiment will be described with reference to FIG. 15. FIG. 15 is a sequence diagram showing an operation example of the mobile communication system according to the modification of the fourth embodiment. It is noted that description will be provided while focusing on a portion different from the above-described embodiment, and description of a similar portion will be omitted, where necessary.

In the aforementioned first embodiment, the UE 100-1 connects to the eNB 200-1. However, in the present embodiment, the UE 100-1 connected to the eNB 200-1 performs handover to the eNB 200-2.

As shown in FIG. 15, D2D communication is performed between the UE 100-1 and the UE 100-2.

Steps S601 to S606 correspond to steps S401 to S406 of the modification of the third embodiment. In addition, while the D2D communication is being performed between the UE 100-1 and the UE 100-2, processes of steps S601 to S606 are executed.

In step S607, the UE 100-1 transmits a measurement report (Measurement report) to the eNB 200-1. The Measurement report includes information indicating the terminal 1, the application identifier, and the required throughput θ1.

In step S608, on the basis of the Measurement report from the UE 100-1, the eNB 200-1 decides to perform handover of the UE 100-1 to the eNB 200-2.

In step S609, the eNB 200-1 transmits a handover request (H.O. Request) for requesting the acceptance of the UE 100-1 to the eNB 200-2.

When the handover request is received, the eNB 200-2 determines whether to permit the handover request on the basis of the handover request. In the present embodiment, a description will be given on the assumption that the eNB 200-2 permits the handover request.

In step S610, the eNB 200-2 transmits a positive response (H.O. Request Ack) for the handover request to the eNB 200-1.

In step S611, the eNB 200-1 transmits an instruction (H.O. Command) of handover to the eNB 200-2 to the UE 100-1 in response to the reception of the positive response (H.O. Request Ack) from the eNB 200-2.

In step S612, the eNB 200-1 transmits data information of the UE 100-1 to the network 600 in response to the reception of the positive response (H.O. Request Ack) from the eNB 200-2. In the present embodiment, the data information includes information indicating the terminal 1, the application identifier, and the required throughput θ1 included in the Measurement report. The network 600 receives the data information.

In step S613, the network 600 determines whether to end the D2D communication. That is, the network 600 determines whether the required throughput θ1 exceeds a predetermined threshold value.

Specifically, the network 600 determines whether the required throughput θ1 exceeds the threshold value β×θth (T(eNB2)).

In this case, even when the handover of the UE 100-1 is not completed, the network 600 compares the required throughput θ1 with the threshold value β×θth(T(eNB1)), which was decided depending on the traffic amount T(eNB2) of the eNB 200-2 serving as a handover destination, other than the threshold value β×θth(T(eNB1)).

In this case, the network 600 may decide the coefficient β to be a value smaller than 1 such that a threshold value is low as compared with the case where the handover of the UE 100-1 is not performed. For example, the network 600 may decide the coefficient β to 0. In this case, even after the handover of the UE 100-1 is performed, the UE 100-1 can continue the D2D communication.

When the required throughput θ1 exceeds the threshold value β×θth(T(eNB2)), the network 600 determines not to end the D2D communication, so that a process of step S614 is executed. Meanwhile, when the required throughput θ1 does not exceed the threshold value β×θth(T(eNB2)), the network 600 determines to end the D2D communication, so that a process of step S615 is executed.

Steps S614 and S615 correspond to steps S507 and S508 of the fourth embodiment.

Conclusion of Fourth Embodiment

In the present embodiment, while the UE 100-1 and the UE 100-2 are performing the D2D communication, the network 300 acquires the throughput θ1, and on the basis of the throughput θ1, the network 600 determines whether to end the D2D communication. As a result, even when the D2D communication is performed, it is possible to end the D2D communication, so that it is possible to further control the number of UEs 100 that perform the D2D communication.

In the present embodiment, while the UE 100-1 is continuing the D2D communication, the network 600 transmits no D2D end instruction. As a result, after the D2D communication is ended once, the D2D end instruction is transmitted. Consequently, since it is less probable for the UE 100-1 having ended the D2D communication in the middle of data transmission to transmit data by cellular communication, it is possible to reduce a load on a network.

In the modification of the present embodiment, when the UE 100-1 performs handover to the eNB 200-2, the network 600 decides a threshold value to be a low value as compared with the case where the UE 100-1 performs no handover. As a result, even when the UE 100-1 performs handover, it is easy to continuously perform. D2D communication, so that the D2D communication of the UE 100-1 and the UE 100-2 is difficult to be interrupted.

Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiments, the network 600 (the MME/S-GW 300) performs determination regarding whether to permit the D2D communication of the UE 100. However, the present invention is not limited thereto. The network 600 may include the eNB 200, and the eNB 200 may perform the determination.

Furthermore, in the aforementioned embodiments, the UE 100-1 transmits the Discover reception information. However, the present invention is not limited thereto. For example, it may be possible to transmit a D2D setup request indicating that the start of the D2D communication is requested. In this case, a partner terminal of the D2D communication may not be discovered.

Furthermore, in the aforementioned embodiments, the network 600 permits the D2D communication by the UE 100-1 and the UE 100-2 on the basis of the received intensity. However, the present invention is not limited thereto. For example, the network 600 may not perform determination based on the received intensity.

Furthermore, in the aforementioned embodiments, the actual measured load level actually measured by the eNB 200 is the traffic amount T. However, the present invention is not limited thereto. For example, the actual measured load level may be a use rate of a radio resource of the eNB 200 or a use amount of the radio resource of the eNB 200.

Furthermore, in the aforementioned embodiments, when the load level of the eNB 200 exceeds a threshold value, it is determined to permit the D2D communication. However, the present invention is not limited thereto. For example, the network 600 may determine to permit the D2D communication with a probability depending on the traffic amount T. That is, the network 600 may permit the D2D communication with a probability depending on a ratio (T/Tmax) of a measured traffic amount T with respect to a maximum traffic amount Tmax. For example, when the ratio is 20%, the network 600 may determine to allow the UE 100 to perform the D2D communication with a probability of 20%.

Accordingly, since it is probable that the D2D communication is permitted even when the traffic amount T of the eNB 200 is low, it is possible to effectively utilize the D2D communication while controlling the number of UEs 100 that perform the D2D communication.

Furthermore, in the fourth embodiment, the network 600 determines whether to end the D2D communication on the basis of the required throughput θ1 and the required throughput θ2. However, the present invention is not limited thereto. For example, as with the first embodiment, the network 600 may determine whether to end the D2D communication on the basis of the traffic amount T.

Needless to say, each of the above-described embodiments and modifications may be combined, where necessary.

In the aforementioned embodiments, an example of the present invention applied to a LTE system; however, it is not limited to the LTE system, and the present invention may be applied to a system other than the LTE system.

In addition, the entire content of U.S. Provisional Application No. 61/806,265 (filed on Mar. 28, 2013) is incorporated in the present specification by reference.

INDUSTRIAL APPLICABILITY

As described above, the communication control method and the processor according to the present invention can reduce a load on a network while controlling the number of user terminals performing D2D communication, and thus it is useful in a mobile communication field.

The invention claimed is:

1. A communication control method, which is applied to a mobile communication system that includes a base station, a user terminal configured to establish a connection with the base station and a network including the base station and a network device configured to be an upper device of the base station, and that supports D2D communication that is direct device-to-device communication, comprising: transmitting, by the user terminal, to the network, data information corresponding to an amount of data scheduled to be transmitted in the D2D communication; acquiring, by the network, an expected load level expected by the data information as a load level of the base station; and determining, by the network, whether to permit the D2D communication of the user terminal on a basis of the load level, wherein in the determining, the network permits the D2D communication when the load level exceeds a threshold value, in the transmitting the data information, the user terminal transmits, to the network, a plurality of pieces of data information corresponding to an amount of data scheduled to be transmitted in each of a plurality of applications used in the D2D communication, in the acquiring the load level, the network acquires a plurality of expected load levels expected by each of the plurality of pieces of data information as a plurality of load levels, and in the determining whether to permit the D2D communication, the network permits the D2D communication when one or more load levels of the plurality of load levels exceed the threshold value.

2. The communication control method according to claim 1, further comprising: calculating, by the network, a sum value of the plurality of load levels when each of the plurality of load levels does not exceed the threshold value in the determining, wherein permitting, by the network, the D2D communication when the calculated sum value exceeds the threshold value.

3. The communication control method according to claim 1, further comprising: deciding, by the network, the threshold value depending on an actual measured load level actually measured by the base station.

4. The communication control method according to claim 1, further comprising: deciding, by the network, the threshold value depending on the number of user terminals that are connected to the base station and scheduled to perform the D2D communication with the user terminal.

5. The communication control method according to claim 1, further comprising: deciding, by the network, the threshold value depending on a load level of a neighboring base station when another user terminal, which is scheduled to perform the D2D communication with the user terminal, is connected to the neighboring base station adjacent to the base station.

6. The communication control method according to claim 1, further comprising: acquiring, by the network, the load level of the base station while the user terminal, which is permitted to perform the D2D communication, is performing the D2D communication in the determining; and determining, by the network, whether to end the D2D communication of the user terminal on the basis of the acquired load level during performing the D2D communication.

7. The communication control method according to claim 6, further comprising: transmitting, by the network, an instruction for ending the D2D communication to the user terminal when it is determined to end the D2D communication in the determining whether to end the D2D communication, wherein in the transmitting the instruction, the network does not transmit the instruction for ending the D2D communication while the user terminal is continuing the D2D communication.

8. The communication control method according to claim 6, further comprising: deciding a threshold value used for comparison in the determining whether to end the D2D communication with the acquired load level during performing the D2D communication, wherein in the deciding the threshold value, when the user terminal performing the D2D communication performs handover to a neighboring base station adjacent to the base station, the network decides the threshold value to be a small value as compared with a case where the user terminal performs no handover.

9. A processor for a network device in a mobile communication system that includes a base station, a user terminal configured to establish a connection with the base station, and a network including the base station and a network device configured to be an upper device of the base station, and that supports D2D communication that is direct device-to-device communication, wherein the processor executes processes of: receiving, from the user terminal, data information corresponding to an amount of data scheduled to be transmitted in the D2D communication; acquiring an expected load level expected by the data information as a load level of the base station; and determining whether to permit the D2D communication of the user terminal on the basis of the load level, permitting the D2D communication when the load level exceeds a threshold value, wherein in the receiving the data information, the processor receives a plurality of pieces of data information corresponding to an amount of data scheduled to be transmitted in each of a plurality of applications used in the D2D communication, in the acquiring the load level, the processor acquires a plurality of expected load levels expected by each of the plurality of pieces of data information as a plurality of load levels, and in the determining whether to permit the D2D communication, the processor permits the D2D communication when one or more load levels of the plurality of load levels exceed the threshold value.

* * * * *